United States Patent [19]

Brauer

[11] Patent Number: 4,464,742
[45] Date of Patent: Aug. 7, 1984

[54] STYLUS CLEANER PAD ORIENTATION IN DISC RECORD PLAYER

[75] Inventor: Eric A. Brauer, Danville, Ind.

[73] Assignee: RCA Corporation, N.Y.

[21] Appl. No.: 426,010

[22] Filed: Sep. 28, 1982

[51] Int. Cl.$^3$ .............................................. G11B 3/58
[52] U.S. Cl. ..................................... 369/71; 15/256.5
[58] Field of Search ......................... 369/71; 15/256.5

[56] References Cited

U.S. PATENT DOCUMENTS 3,878,578  4/1975  Skudrna ............................ 15/256.5

Primary Examiner—Steven L. Stephan
Attorney, Agent, or Firm—Eugene M. Whitacre; William H. Meise; Dilip A. Kulkarni

[57] ABSTRACT

The in-arm stylus cleaner includes a cleaner arm mounted for to-and-fro motion in the stylus arm carriage. A cleaning element, comprising a piece of compliant sheet, has one edge secured to the cleaner arm such that the cleaning element extends away from the cleaner arm substantially at right angles thereto. To clean the stylus, the cleaner arm is retracted, the reproducing stylus is raised back up into the carriage arm, the cleaner arm is freed to allow a wiping element mounted thereon to sweep the stylus tip, and the stylus is then gently lowered onto a turntable-disposed record to resume playback operations.

3 Claims, 7 Drawing Figures

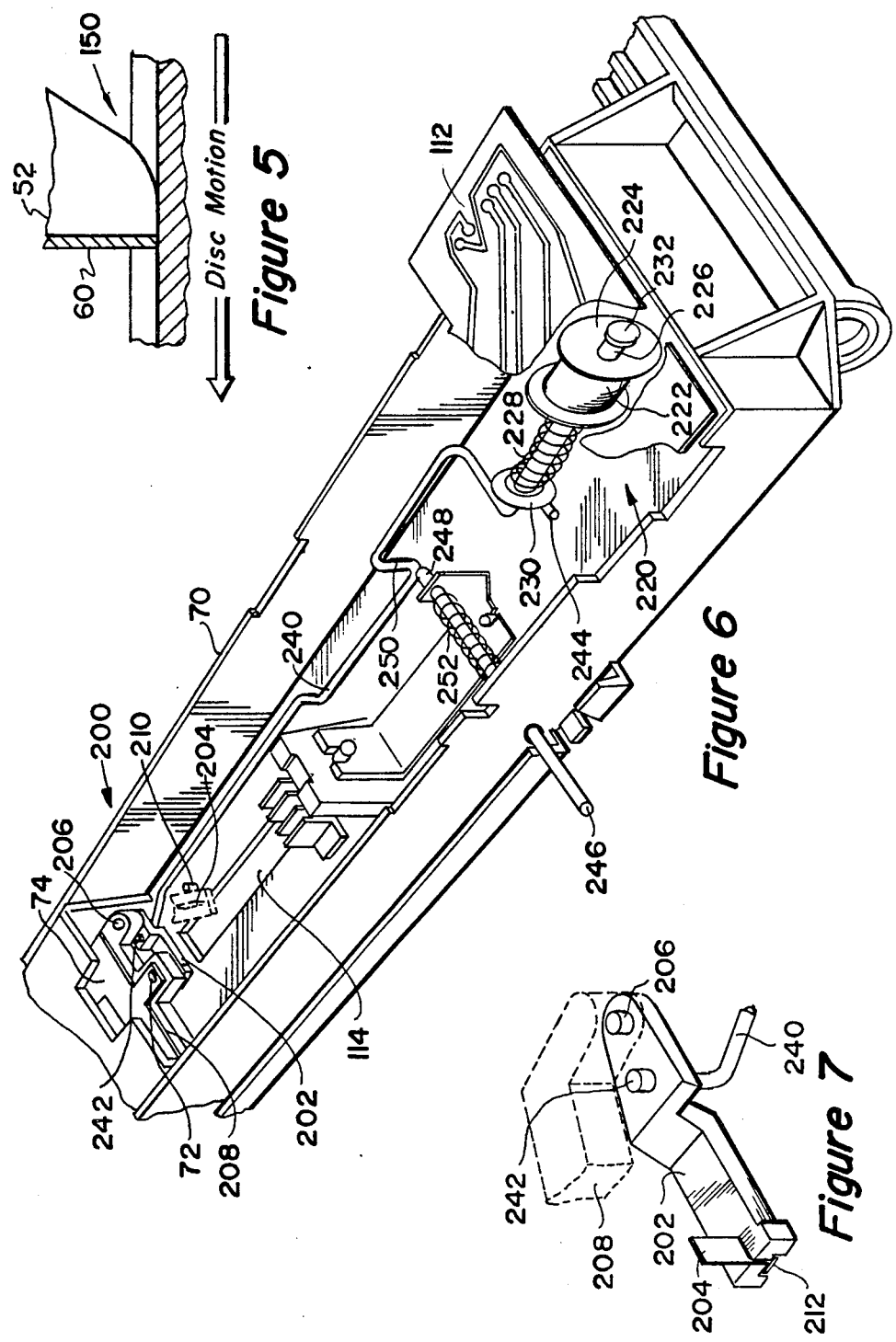

STYLUS CLEANER PAD ORIENTATION IN DISC RECORD PLAYER

The present invention generally relates to a system for automatically cleaning a reproducing stylus in a record player and, more particularly, to a stylus cleaning system housed in a stylus arm carriage.

There are several applications where it is desirable to automatically clean the tip of a pickup stylus to get rid of accumulated dust and debris which might otherwise obscure the desired signal recovery. Such applications may arise in the context of audio and audiovideo systems for recovering information recorded on a disc record medium.

One such application is the capacitive type video disc system. Here, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In the video disc systems, the information track density is generally quite high. For example, one commercially available system ueses a spirally-grooved information track with a groove density of nearly 10,000 grooves per inch (i.e., groove width=2.5 micrometers and groove depth=less than 1 micrometer). During playback, the stylus tip is received in the groove and guided toward the record center as a turntable-supported record revolves at the desired speed. The microscopic groove geometries require a stylus that has rather fine dimensions (e.g., stylus tip width=2 micrometers, stylus tip depth=5 micrometers and stylus tip height=3 micrometers). It is generally the practice with such high density records (both grooved and flat records) to mount the signal recovery stylus in a protective cartridge which, in turn, is installed in a translatable carriage. The bottom wall of the carriage has an elongated aperture through which the stylus is selectively lowered onto a turntable-supported record. The carriage is driven to cause it to follow the radially inward motion of the groove-guided stylus. Typically, a mechanism to lift and lower the stylus to effect stylus/record disengagement and engagement is located in the carriage. See, for example, U.S. Pat. No. 4,266,785 which issued to T. W. Burrus on May 15, 1981.

It is also known that the signal-to-noise ratio, or, more generally, the quality of the recovered signal is affected by such things as microscopic dust and debris adhering at the base of the pickup stylus or under the stylus shoe. The dust referred to here can come from the atmosphere. The debris, on the other hand, can come out of the information track as the stylus rides in the record groove.

In video disc players, it is advantageous to provide the ability to quickly locate a precise segment of the prerecorded program on a disc. To this end, the player is subject to disposition in one of four search modes—i.e., visual search (forward/backward) and rapid access (forward/backward). In visual search, the stylus is rapidly swept across the record while in engagement therewith (at 16 times the normal playback speed). In rapid access, the stylus is driven across the record at a much greater speed (at 120 times the normal playback speed) while it is down. During high speed visual search, there is a potential for a buildup of dust and debris around the stylus to the extent that the stylus shoe is physically separated from the record, causing degradation or even loss of signals at the output of the stylus. The loss of signals at the stylus output is sometimes referred to as a "carrier distress" problem.

In a concurrently-filed, commonly-assigned U.S. patent application, Ser. No. 426,009, of Hackett et al., entitled "IN-ARM STYLUS CLEANER FOR DISC RECORD PLAYER", a mechanism is housed in the carriage arm for cleaning the stylus whenever a carrier distress condition occurred during playback. The therein disclosed stylus cleaner mechanism includes a stylus wiping element holder mounted in the carriage arm for a to-and-fro motion between an advanced position and a retracted position. A selectively-actuated sequencing means, which when activated, retracts the holder when the stylus is down, raises the stylus back up into the carriage arm, releases the holder to return to its initial position while the stylus is up to permit a holder-mounted stylus cleaning element to wipe the raised stylus, and then lowers the stylus back down to resume playback operations.

One way of attaching the stylus cleaning pad to the holder is to lay it flat on the holder. A problem with such an arrangement is the difficulty of dealing with the full range of height variations between the holder and the stylus due to tolerance stackup. If the holder is set too close to the stylus, there is the risk of damaging the stylus as the holder swings by it to wipe it clean. If the holder is set too low, there is the possibility of missing the stylus completely during the cleaning cycle.

The present invention overcomes the abovementioned tolerance buildup problems without sacrificing the objects of the in-arm stylus cleaner of Hackett et al. In accordance with the present invention, the stylus wiping element consists of a piece of compliant sheet having an edge secured to the stylus cleaning element holder such that the compliant sheet extends away from the holder. When the holder is released to return to its original position, the free end of the flat compliant element wipes the stylus to effectively rid it from any dust and debris.

In the Drawings

FIG. 5 illustrates the stylus/record interface;

FIG. 6 depicts an enlarged perspective view of the instant in-arm stylus cleaner, and FIG. 7 portrays the orientation of the stylus cleaner pad pursuant to this invention.

Figure 1:
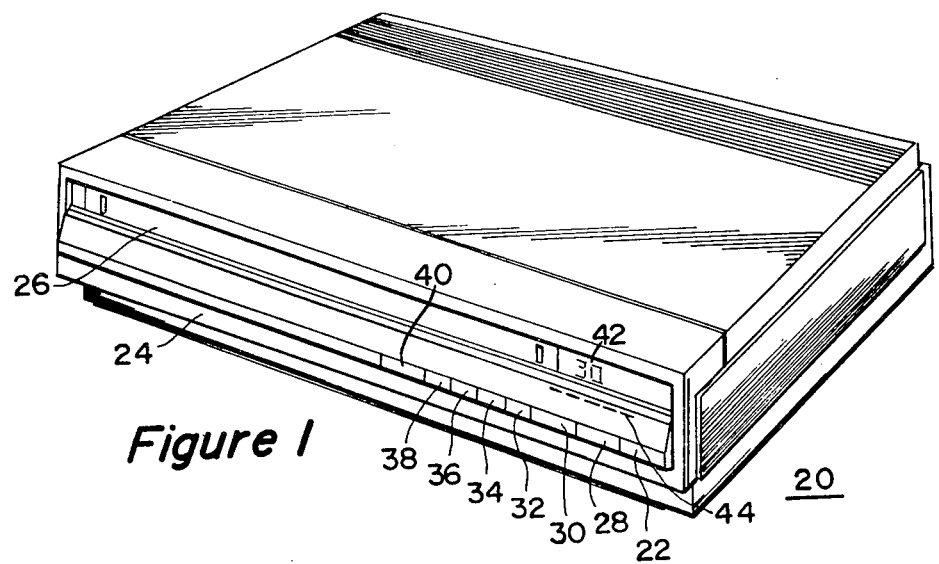
FIG. 1 is a perspective view of a video disc player incorporating the aforesaid Hackett et al. in-arm stylus cleaner and utilizing the cleaner pad orientation in accordance with the present invention.

Shown in FIG. 1 is a video disc player 20 incorporating an in-arm stylus cleaning mechanism of the type described in the aforesaid Hackett et al. U.S. patent application, and having the stylus cleaning pad orientation feature of the present invention. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record while in engagement therewith (at 16 times the normal playback speed). In rapid access, the stylus is moved sideways at a very high speed (at 120 times the normal playback speed) while it is in engagement with the record. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
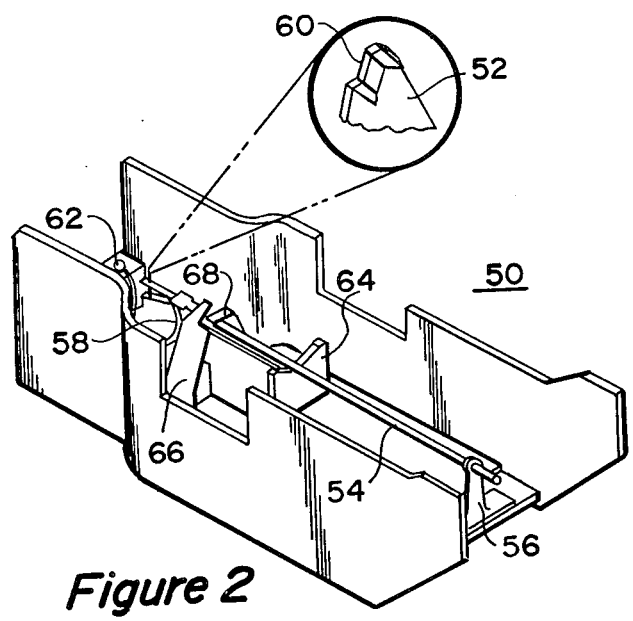
FIG. 2 illustrates a perspective view of a stylus cartridge suitable for use with the video disc player of FIG. 1, and shown in an inverted position to illustrate the construction details.

FIG. 2 is a perspective view of a stylus cartridge 50, shown upside-down to reveal it construction. The cartridge 50 comprises a stylus 52 firmly secured at one end of an elongated, tubular stylus arm 54. The other end of the stylus arm 54 is flexibly suspended in the cartridge enclosure by a thin compliant suspension 56. The stylus tip is about 2 micrometers wide, 5 micrometers deep, and 3 micrometers high. The stylus arm 54 is in the form of a hollow aluminum tube with approximately following dimensions: length=1.654 inches, outside diameter=0.044 inches and inside diameter=0.040 inches. A leaf spring or flylead 58 is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back within the confines of the cartridge housing against a stop 64 by a set of retaining fingers 66 and 68. When the cartridge 50 is installed in the player, the retaining springs 66 and 68 are automatically spread apart to release the stylus arm 54.

Figure 3:
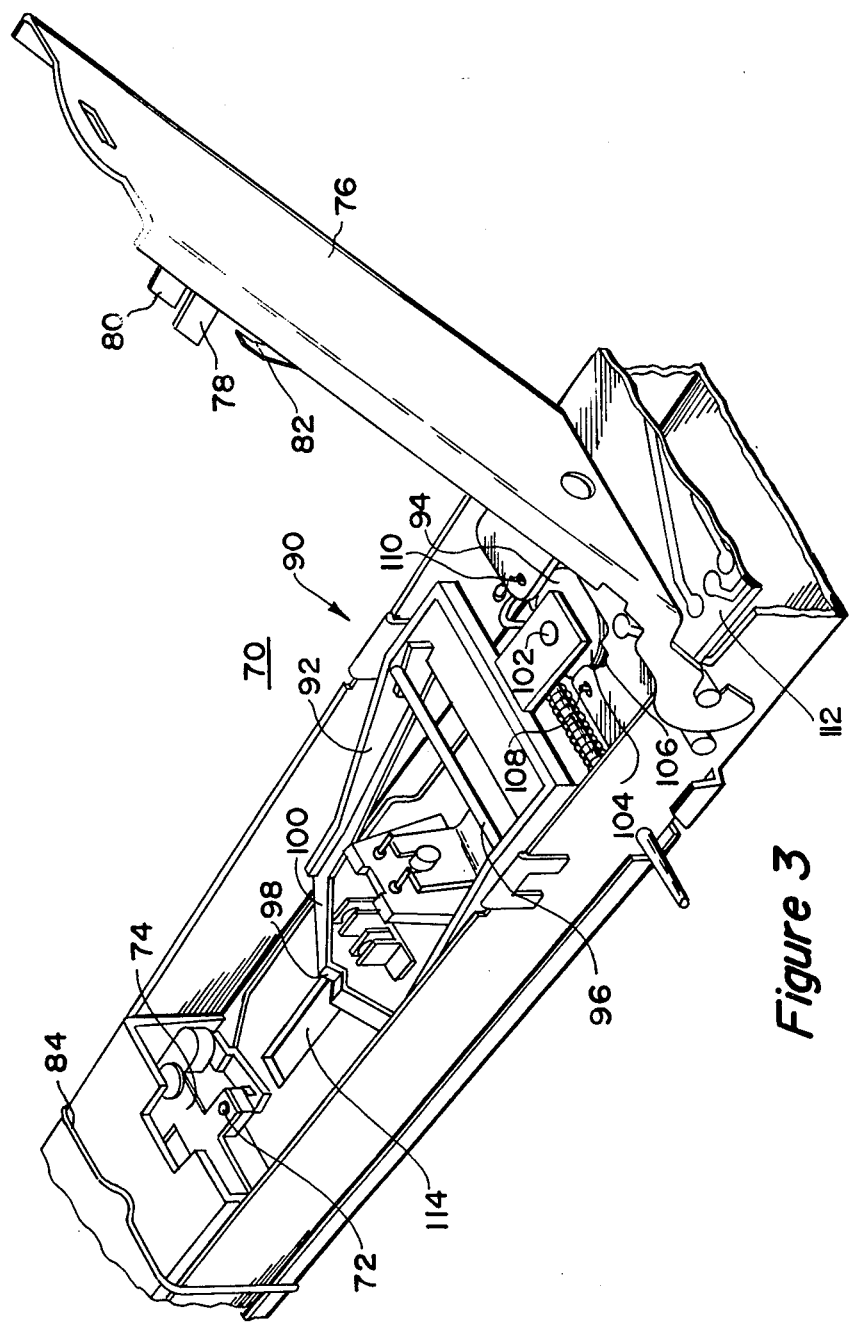
FIG. 3 represents an isometric view of a carriage arm translatably mounted in the FIG. 1 player in which the subject in-arm stylus cleaner is located.

The stylus cartridge 50 is installed in a carriage 70 shown in FIG. 3. The carriage 70 is translatably mounted in the player in the manner described later. The terminal 62 disposed on the cartridge case engages an input terminal 72 of the pickup electronics 74 housed in the carriage 70 upon reception of the cartridge therein. The carriage lid 76 is fitted with a pair of depending tabs 78 and 80, which engage and spread apart the stylus arm retaining springs 66 and 68 to free the stylus arm 54 when the carriage lid is closed. A leaf spring 82 arranged on the underside of the carriage lid 76 holds the cartridge 50 in place. A wire hoop 84 is provided to lock the carriage lid 76.

The carriage 70 is further equipped with a stylus lifting/lowering device 90 comprising a pivotally-mounted, stylus arm bracket 92 and a selectively-actuated electromagnet 94. The stylus arm bracket 92 is swingably mounted in the carriage 70 about a cross rod 96. When the cartridge 50 is positioned in the carriage 70 and the lid 76 is locked shut, the stylus arm 54 comes to rest in a raised position in a centering depression 98 provided on the cross member 100 of the stylus arm bracket 92. Depending downwardly from the other side of the stylus arm bracket 92, and fixedly secured thereto, is a permanent magnet 102. The permanent magnet 102 has a portion extending into an air gap defined by a non-magnetic core 104 of the electromagnet 94. Disposed about the core 104 is an electrical winding 106 having a pair of terminals 108 and 110 connected to an energization means 112. In the normal condition—i.e., in the absence of signals applied to the electromagnet 94—, the distribution of the weight of the stylus arm bracket 92 is such that the stylus arm 54 is held in the lifted position. When an appropriate signal is applied to the terminals 108 and 110, the bracket-mounted magnet 102 is repelled out of the air gap of the electromagnet to slowly set the stylus 52 down. The energization means 112, when actuated, applies a particular form of signal to the electromagnetic device 90 to assure a gentle stylus set down. The bottom wall of the carriage 70 has an elongated opening 114 to permit the stylus 52 to pass out of the confines of the carriage when the stylus lifting/lowering mechanism 90 is activated.

As will be evident from the brief description of the operation of the video disc player, there are several modes of operation in which the stylus 52 is lowered or lifted. For example, the stylus lifting/lowering device 90 is activated to lower the stylus 52 on a turntable-supported disc for playback, or on a wiping pad for cleaning the stylus tip. The signals are removed from the terminals 108 and 110 of the electromagnet coil 106 to raise the stylus 52 back up into the carriage 70 when the player is set in the PAUSE or OFF modes.

Figure 4:
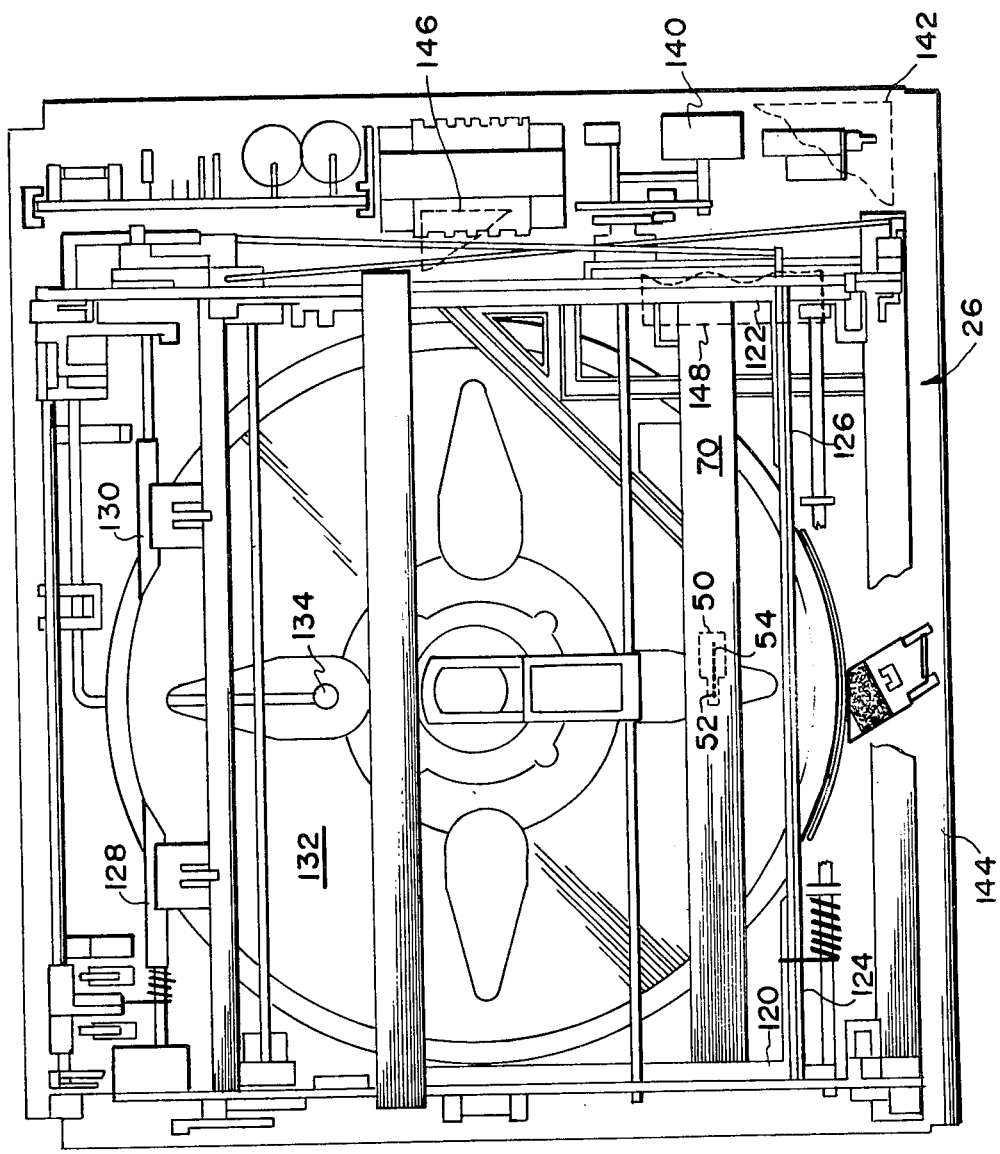
FIG. 4 shows a top view of the video disc player of FIG. 1 with its cover removed to show the underlying details.

Referring to FIG. 4, the pickup carriage 70 is mounted in the player for motion between an off-record rest position and an on-record, end-of-play position along a path defined by a pair of guide rails 120 and 122. A record is loaded into the player by inserting a full caddy into the player. Upon the extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, and entitled "DISC PLAYER HAVING RECORD HANDLING APPARATUS", describes a suitable record extraction and transfer mechanism.

A stepper motor 140 drives the carriage 70 from the off-record rest position to a starting position over the turntable-supported record, and the stylus arm lifting/- lowering device 90 is energized to lower the stylus 52 onto the record. During playback, the carriage 70 is driven toward the record center so as to cause it to track the radially-inward motion of the stylus 52. The signals at the output of the reproducing stylus 52 are processed by the pickup circuits 74 housed in the carriage 70, and fed to signal processing circuitry disposed on a signal board 142 attached to the centerplate 144 of the player. The signal processing circuitry converts the signals at the output of the pickup circuits 74 into a form suitable for application to a conventional television receiver. When the carriage 70 reaches the end-of-play position, the stylus 52 is raised and the carriage is driven back until it operates a microswitch to reset it at its off-record rest position. The record is automatically transferred back to the record receiving pads 124, 126, 128 and 130. The record is then retrieved from the player by inserting an empty sleeve into the player and withdrawing it therefrom.

Disposed on the signal board 142 are two microcomputers—a mechanism microcomputer 146 and a player control microcomputer 148. The mechanism microcomputer 146 is responsible for sequencing and controlling the caddy loading/unloading mechanism, record transfer mechanism and turntable drive mechanism. The player control microcomputer 148 has the responsibility for sequencing and controlling the carriage drive mechanism, stylus lifting/lowering mechanism and other player control functions.

During playback, the stylus 52 encounters groove defects which have a tendency to abrade the stylus and the stylus electrode. To protect the delicate stylus electrode 60 (0.2×2.0 micrometers) from damage, it is desirable to locate it on the trailing face of the stylus body. In other words, the motion of a turntable-mounted record 150 is such that the portion of the record beneath the stylus 52 encounters the stylus electrode 60 last in the manner depicted in FIG. 5.

The subject video disc player is equipped with an in-arm stylus cleaning mechanism 200 of the type described in the aforementioned U.S. patent application of Hackett et al. The in-arm stylus cleaner 200 includes a pivotally-mounted cleaner arm 202 to which a stylus cleaning pad 204 is secured according to this invention. The cleaner arm 202 is swingably mounted in the carriage 70 about a vertical pin 206 for a to-and-fro motion in a plane substantially parallel to the turntable 132 between an advanced position and a retracted position defined, respectively, by the wall of a resonator block 208 on an upstanding post 210 provided in the carriage 70.

The stylus cleaning element 204 comprises a piece of compliant sheet having an edge secured to the cleaner arm 202 such that the sheet extends away from the cleaner arm at substantially right angles to it, as can be seen from FIG. 7. Examples of materials suitable for the wiping element 202 include 30 Durometer Butyl rubber, silicone rubber, etc. Illustrative dimensions of the cleaning element 204 are: length=1.175 inches, width=0.115 inches and thickness=0.008 inches. To secure the stylus cleaning element 204 to the cleaner arm 202, the cleaning element is stretched, slid sideways into a slot 212 provided in the cleaner arm, released and then pulled up until it stops against the cleaner arm to give it an appropriate height. The perpendicular orientation of the compliant cleaning element 204 serves to accommodate the full range of the height variation (e.g., due to tolerance stackup) between the stylus 52 disposed in the raised position and the swingably-mounted cleaner arm 202 without the risk of damaging the stylus. Several variations in the orientation of the cleaner pad 204 are possible. For example, the cleaner element 204 can be angularly disposed in respect of the turntable 132 instead of at right angles to it.

The in-arm stylus cleaner 200 further includes a solenoid 220 comprising an electrical winding 222 disposed about a non-magnetic core 224 and a tubular, slidably-mounted magnetic element 226 disposed in the air gap formed by the non-magnetic core. A coil spring 228 is arranged between one face of the plastic core 224 and a retaining washer 230 disposed on the slidable metal element 226 at one end thereof for biasing the metal element away from the air gap. The metal tube 226 is flared at its other end 232 to hold it in place.

An actuating member 240 has one end 242 hooked into a hole in the cleaner arm 202 and the other end 244 hooked into the hollow metal tube 226 through a hole therein. When the player control microcomputer 148 sends electrical current through the solenoid winding 222, it draws in the slidable element 226, which, in turn, retracts the cleaner arm 202 against the upstanding post 210 in the manner shown in fantom in FIG. 6. When the electrical current is removed from the winding 222, the biasing spring 228 drives the cleaner arm 202 back to its advanced position against the wall of the resonator block 208.

A spring-loaded plunger 246 is reciprocably mounted in the carriage 70 as shown. When the player control microcomputer 148 lifts the stylus 52 up and sends the carriage 70 back at the end of a playback cycle, the front wall of the player pushes the plunger 246 in as the carriage arm arrives at the home position, so that a portion 248 of the plunger engages a vertical portion 250 of the wire form 240 to block accidental retraction of the cleaner arm 202. To protect the delicate stylus electrode 60 (0.2×2.0 micrometers), it is desirable to prevent retraction of the cleaner arm 202 when the stylus 52 is up to avoid wiping of the stylus in a direction from the electrode toward the stylus shoe. When the carriage 70 is advanced toward a turntable-mounted record 150 (e.g., approximately 0.3 inches), a coil spring 252 disposed about the plunger 246 causes the plunger to withdraw to the position shown in FIG. 6 to, in turn, release the actuating member 240.

During playback, the in-arm stylus cleaning sequence is triggered under two circumstances—when the player control microcomputer 148 senses carrier distress for a certain duration of time (e.g., 3 seconds), and when the user operates the PAUSE button 30. When triggered for an in-arm stylus cleaning operation, the control microcomputer 148:

- activates the cleaner solenoid 220 while the stylus 52 is down to cock the cleaner arm 202 against the upstanding post 210,
- operates the lifter electromagnet 94 to raise the stylus 52 to a position against the cartridge stop 64,
- waits for approximately 0.5 seconds to allow the stylus 52 to arrive at its raised position,
- releases the sweeper arm 202 to cause the compliant cleaning pad 204 to flick the stylus 52 in the right direction to free it from the dust and debris buildup, and
- reenergizes the lifter 90 to gently lower the stylus 52 onto the record 162 to resume the playback sequence. (When the in-arm stylus cleaning operation is caused by the activation of the PAUSE button 30, the player control microcomputer 148 waits for the reactivation of the PAUSE button to set the stylus 52 back down on the record 162.)

In this particular application, the player control microcomputer 148 simultaneously issues commands to both the cleaner solenoid 220 and the lifter electromagnet 94. But due to the mechanical delays involved, the cleaner 200 responds faster (25 milliseconds) than the lifter 90 (0.25 to 0.5 seconds) to assure that (1) the cleaner arm 202 is fully cocked before the stylus 52 is raised, and (2) that the cleaning pad 204 sweeps the stylus before it is lowered onto the record.

The invention described herein presents a group of elements, all of which can be placed within the confines of the carriage arm, for effectively ridding the reproducing stylus of any foreign matter by simply raising it within the carriage, wiping it with a cleaning pad, and then lowering it back down onto the record. This invention may be useful in applications such as digital record players as well as video disc players, and may be equally useful with grooved as well as flat records.

What is claimed is:

1. In a record player including a pickup stylus subject to engagement with a turntable-supported record for recovering prerecorded information disposed thereon during playback; said stylus being mounted at one end of a stylus arm having the other end yieldably supported in a translatable carriage; said player further having means mounted in said carriage for lifting and lowering said stylus in a manner causing said stylus to protrude from said carriage to effect engagement and disengagement of said stylus with a record mounted on said turntable; said player further including means mounted in said carriage for selectively cleaning said stylus; said stylus cleaning means comprising a holder carrying a stylus wiping element, and a selectively-actuated means for causing motion of said holder while said stylus is rigidly held in said carriage at a position spaced from a turntable-mounted record such that said wiping element cleans said stylus; wherein said wiping element is in the form of a piece of compliant sheet having an edge secured to said holder such that the free edge of said compliant sheet extends away from said holder for selectively wiping said rigidly-held, spaced stylus.

2. The stylus cleaning means as defined in claim 1 wherein said planar wiping element is attached to said holder such that it is normally disposed at right angles to said turntable.

3. The stylus cleaning means as set forth in claim 1 wherein said stylus wiping element is secured to said holder by inserting it in an elongated slot disposed on said holder.

* * * * *